Dec. 10, 1968  C. S. SIMONDS  3,415,333
MANUAL RANGE CHANGER FOR WEIGHING SCALES
Filed Nov. 17, 1965  2 Sheets-Sheet 1

INVENTOR.
CLARENCE S. SIMONDS
BY
Thomas H. Grafton
ATTORNEY

United States Patent Office 3,415,333
Patented Dec. 10, 1968

3,415,333
MANUAL RANGE CHANGER FOR
WEIGHING SCALES
Clarence S. Simonds, Toledo, Ohio, assignor, by mesne assignments, to The Reliance Electric and Engineering Company, Toledo, Ohio, a corporation of Ohio
Filed Nov. 17, 1965, Ser. No. 508,328
5 Claims. (Cl. 177—210)

ABSTRACT OF THE DISCLOSURE

An electronic weighing scale having a certain capacity and a range changer for increasing the capacity. The range changer is mechanically adjusted to offset tare and/or to offset net or gross load.

---

This invention relates to weighing scales and more particularly to electrical or electronic weighing scales which are provided with range changers for varying their load off-setting capacities.

Heretofore, the increased capacity provided by the range changer was used to offset net or gross load only, tare being offset by means of a tare potentiometer having a capacity only as great as the normal capacity of the weighing scale with the range changer in its zero setting, i.e., the dial capacity. The tare adjustment is used to set the zero of the indicator, so that container weights or build-up of residue may be zeroed out of the weight indication. Larger potentiometers either are too inaccurate or too expensive to be practicable. In the past, no means has been provided in electrical or electronic weighing scales for taring off loads greater than the dial capacities.

The objects of this invention are to improve load measuring devices, to provide means in electrical or electronic weighing scales for taring off loads greater than the normal or dial capacities of the scales, to provide calibrated tare devices in such scales having capacities equal to the full capacities of the dials plus all extra ranges provided by range changers, and to provide a range changer for electrical or electronic scales having a double use, namely, for offsetting tare loads and for offsetting net or gross weight loads.

One embodiment of this invention enabling the realization of these objects makes use, in an electrical or electronic weighing scale, of a range changer having movable multitapped means and movable slider means which engages the impedance means. The multitapped means are rotated in one direction to set the tare by means of a calibrated tare knob and the slider means is rotated in the opposite direction to change the range and drive a unit weight indicator. The tare knob is detented for adding calibrated tare with each step equal to one full capacity of the dial. Accordingly, in a 20,000 pound scale having a 2,000 pound dial and nine added range steps each worth 2,000 pounds, 20,000 pounds can be tared off.

In accordance with the above, one feature of this invention resides in providing, in an electrical or electronic weighing scale, a calibrated tare equal to the full capacity of the scale's dial plus all extra ranges.

Another feature resides in dividing the range change into as many steps as practicable and then providing for the double use of the range changer with a safeguard provided for preventing independent movement of the movable multitapped means and the movable slider means beyond that necessary in adding the maximum number of such steps. In a nine-range-step scale (nine "electronic unit weights"), if two steps are used for tare only seven unit weights can be used for net weight weighing.

Other objects, features and advantages of this invention will become apparent from the following detailed description taken in connection with the accompanying drawings, wherein.

Figures 1, 2:
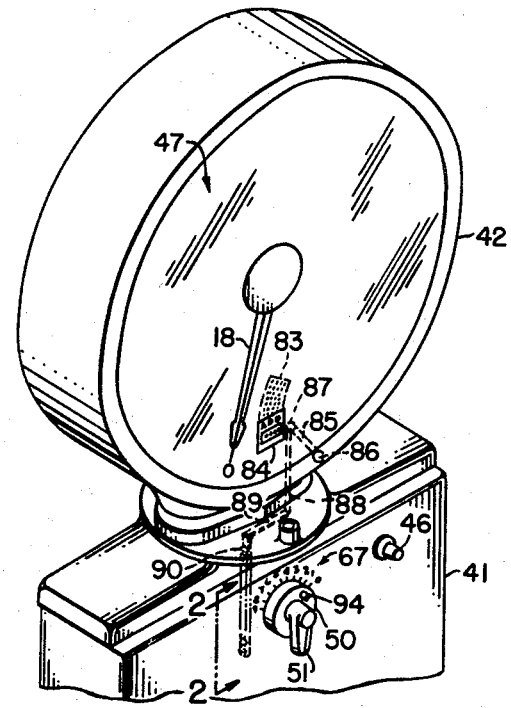
FIG. 1 is a fragmentary perspective view of the upper part of the cabinet and the dial housing of an electrical or electronic weighing scale.
FIG. 2 is an enlarged vertical sectional view taken generally along the line 2—2 of FIG. 1.

A weighing scale embodying the invention includes a cabinet 41 surmounted by a dial housing 42. A load receiving mechanism (not shown) is provided which is operatively connected to a load cell or transducer means 43 (FIG. 3) comprising a resistance wire strain gage bridge 10. The bridge is of an ordinary type used in gages available for measuring strain.

In order that measurements of load applied to the load cell 43 may be obtained, there are provided leads 12 and 13 from the output terminals of the bridge 10. When energized from a secondary winding 11, the load cell 43 produces an output voltage which is a function of load applied to the weighing scale. The current and voltage supplied by the secondary winding 11 is maintained at the desired level by resistors 14 and 15. The lead 13 is connected to an error detecting amplifier and servo motor control device 16. The amplifier 16 controls the operation of a servo motor 17 which positions an indicator 18 (FIGS. 1 and 3) and the sliding contact 19 of a potentiometer 20 by way of a suitable driving connection 21. The potentiometer 20 is an adjustable means in circuit with the load cell 43 for supplying a balancing voltage in opposition to the output voltage of the load cell and the amplifier 16 and servo motor 17 is a servo means in circuit with the load cell 43 and the potentiometer 20 for adjusting the potentiometer 20 in a balancing direction in response to differences between the voltages.

Figure 3:
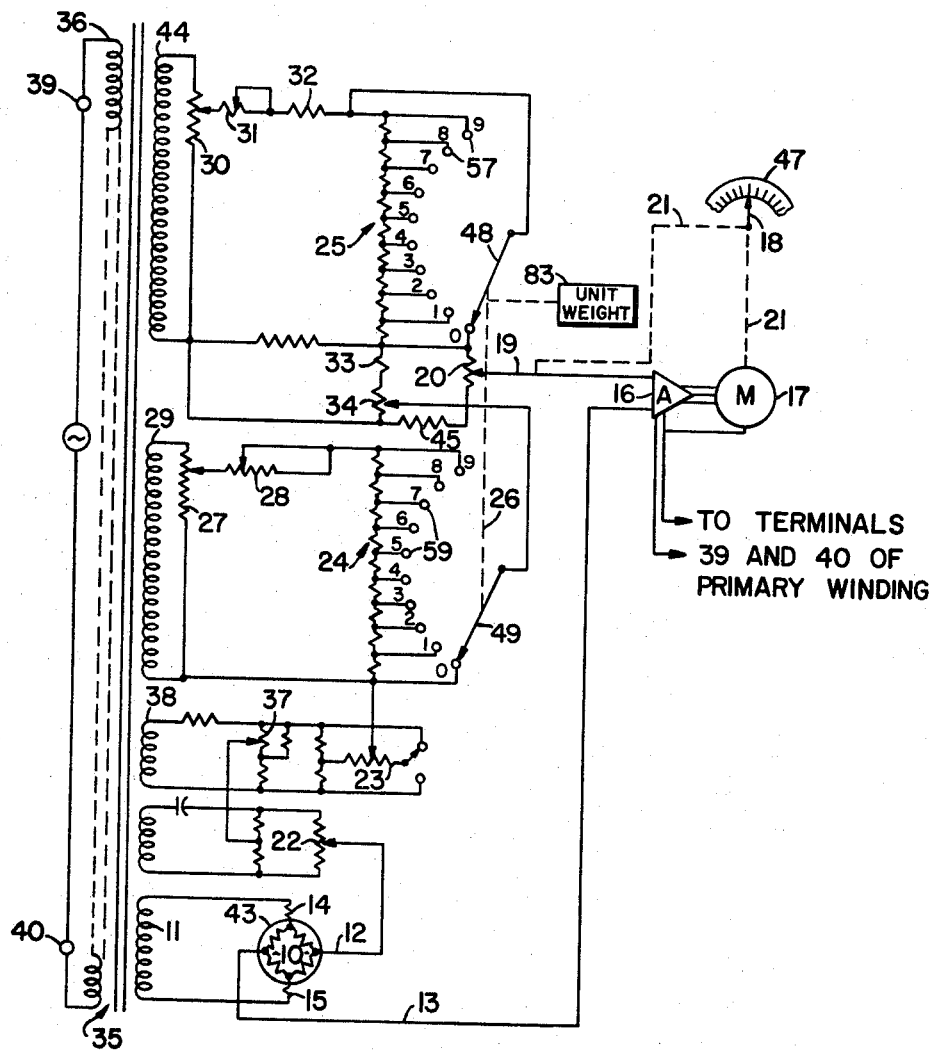
FIG. 3 is a schematic wiring diagram showing the essential components of an electrical or electronic weighing scale.

Additional counterbalancing voltage which also is in phase opposition to the output voltage from the load cell 43 is generated by connecting a quadrature adjust potentiometer 22, a zero adjust potentiometer 23, a multitapped range step resistor or multitapped impedance means 24, and a multitapped span resistor 25 by way of a double-decked selector switch 26 between the load cell 43 and the potentiometer 20 as shown in FIG. 3. The proper voltage across the multitapped resistor 24 is established by connecting a potentiometer 27 and a variable resistor 28 between the multitapped range step resistor 24 and a secondary transformer winding 29. The multitapped resistor 24 is part of a capacity changing means or range changer in circuit with the adjustable means or potentiometer 20 for adding increments of voltage to the balancing voltage supplied by the potentiometer 20 to increase the capacity of the scale. The multitapped resistor 24 has nine taps which with the potentiometer 20 form ten divisions or range steps over which the zero to full load capacity of the load cell 43 is divided.

The proper voltage across the potentiometer 20 for the particular range step desired is established by a potentiometer 30, connected across a secondary winding 44, a variable resistor 31, a fixed resistor 32, the multitapped span resistor 25, a fixed resistor 33, and a tare adjust potentiometer 34. Potentiometer 20 and a fixed resistor 45 form a series circuit across the resistor 33 and the tare potentiometer 34. The load cell 43 is supplied with alternating current from the secondary winding 11 of a power transformer 35 which has its primary winding 36 connected to a suitable source of alternating current and its terminals 39 and 40 connected to the amplifier 16 as indicated in FIG. 3. Operating potential to the control and excitation winding of the servo motor 17 is supplied by connecting them to the alternating current source. The quadrature adjust potentiometer 22 introduces a quadrature signal which is 90 or 270 electrical degrees out of phase with the signal generated by the load cell 43 and thereby cancels the quadrature component of the load cell signal to ensure that the amplifier 16 will not be saturated by these components. The zero adjust potentiometer 23 and a zero adjust potentiometer 37 connected in circuit with a secondary winding 38 provide a voltage which is proportional to the dead load of the system and 180 electrical degrees out of phase with the output voltage from the load cell 43 to thereby further reduce the load cell signal.

The tare potentiometer 34 is operated by means of a knob 46 (FIG. 1) and functions to insert a small signal in series with the counterbalancing voltage and is adjustable to balance the output of the potentiometer 20 so that the dial indicator 18 will be positioned at zero as shown in FIG. 1 on a chart 47 (also shown in FIG. 3) with no or small tare load upon the scale. The potentiometer 34 compensates for the end resistance of the potentiometer 20. The resistance afforded by the resistor 45 adds to the effective end resistance of the potentiometer 20, that resistance which is actually still in circuit even though the adjustable arm 19 of the potentiometer 20 is at its lowermost setting, and accordingly results in the adjustable arm of the potentiometer 34 being positioned midway of its end terminals to permit zero or tare adjustment in both directions. The tare potentiometer 34 is properly set when the differential voltage between the wipers of the potentiometers 20 and 34 is zero. Upon the differential voltage between the wipers of potentiometers 20 and 34 being zero, the span voltage or voltage across the potentiometer 20 can be varied by different settings of the span adjusting resistor 25 without changing the zero position of the wiper 19.

By means of the double-decked switch 26, the potential across the adjustable potentiometer 20 is varied in accordance with the range step setting of the multitapped resistor 24 and, accordingly, load applied to the load cell within the capacity of the weighing scale is accommodated. Since it is desired that the weighing scale have a high sensitivity and a high capacity, the potentiometer 20 cannot be the sole counterbalancing voltage source to oppose the voltage generated by the load cell 43, and if that were the case the entire expanse between the limits or terminals of the potentiometer 20 would have to be divided over the full capacity of the load cell system. However, by providing the 9-tap resistor 24 and the additional potentiometer 20 only ten percent of the full capacity of the load cell voltage need be counter-balanced by the potentiometer 20 for any given loading condition. Accordingly, a great increase in sensitivity is achieved by using a voltage balancing arrangement wherein the potentiometer 20 and the multitapped resistor 24 conjointly provide enough counterbalance voltage to oppose the output voltage of the load cell 43.

It may turn out that the load cell 43 will yield, for example, 3 millivolts of voltage for a first 10,000 pounds, 7 millivolts for 20,000 pounds, 12 millivolts for 30,000 pounds, . . . and 74 millivolts for 100,000 pounds. This is not a linear function and it would not be accurate to position the taps on the resistor 24 to yield equal increments of voltage for higher or lower changes. Means are provided to ensure that the potentiometer 20 has the correct voltage differential thereacross for the particular range step then in operation. This is accomplished by the multitapped resistor 25 and a movable slider 48 of the double-decked switch 26, for, if the tap setting of the resistor 24 is changed by its movable slider 49 of the double-decked switch 26, a corresponding change in the tap setting of the resistor 25 occurs to ensure that the potentiometer 20 will at all times have the correct voltage thereacross. Accordingly, with no range steps placed into operation, both of the sliders 48 and 49 are respectively at the zero taps of the resistors 24 and 25, and while in that position with reference to the above example the adjustable potentiometer 20 has a voltage thereacross of 3 millivolts. If the amplifier 16 continues to develop an error signal indicating that the balancing voltage is not large enough to counterbalance the output voltage of the load cell 43, the servo motor 17 drives the differentially positionable arm 19 of the adjustable potentiometer 20 to its upper terminal of travel. As long as there is an unbalance between the output voltage of the load cell 43 and the counterbalancing voltage, the servo motor 17 operates to vary the counterbalancing voltage by moving the slider 19. The amount of counterbalancing voltage is indicated in terms of weight on the chart 47 (FIGS. 1 and 3).

The tare potentiometer 34 has a capacity only as great as the dial capacity. Larger potentiometers either are too inaccurate or too expensive to be practicable. In the past, no means has been provided in electrical or electronic scales for taring off loads greater than the dial capacities. One of the features of this invention resides in providing a calibrated tare equal to the full dial capacity plus all extra ranges. This is accomplished by providing the range changer or capacity changing means with movable multitapped means, i.e., the taps of the multitapped resistor 24 are movable, and with the movable slider 49. The taps of the resistor 24 are rotated in one direction to set tare by means of a calibrated tare knob 50 and the slider 49 is rotated in the opposite direction to change the range by means of a handle 51.

The tare knob 50 is attached by means of a set screw 52 to a short shaft 53 journaled in a stationary detent plate 54 and carries a rotatable plate 55 attached to the shaft by means of a set screw 56. The tare knob 50 is located exteriorly of the cabinet 41 and the short shaft 53 extends from the tare knob 50 into the cabinet 41. The taps 57 of the span resistor 25 (FIG. 3) are carried on a rotatable switch wafer 58 and the taps 59 of the resistor 24 (FIG. 3) are carried on a rotatable switch wafer 60 (each rotatable less than 360 degree), leads not shown in FIG. 2 connecting such taps to their respective resistors as shown in FIG. 3. The switch wafers 58 and 60 are connected to move together as one of the rotatable plate 55 by means including bars 61. Accordingly, rotation of the tare knob 50 produces rotation of the taps 57 and 59. The tare knob 50 is detented for adding calibrated tare with each step equal to one full capacity of the dial. This is accomplished by a detent ball 62 which is urged out of a hole 63 in the tare knob 50 by means of a spring 64 in the hole into engagement with the stationary plate 54. The stationary plate 54 has ten spaced depressions 65, one for each of the ten taps 59 and the corresponding ten taps 59, which receive the ball 62. Hence, movement of the tare knob 50 from one detent position to another moves the taps 57 and 59 into contact with their respective sliders 48 and 49. Movement of the taps 59 counterclockwise as viewed in FIG. 3 into contact with the slider 49 adds increments of voltage are added when the slider 49 is moved to the "0" of the scale in the same manner as such increments of voltage are added when the slider 49 is moved to the "0" tap to the "1" tap, etc. as described above.

The taps 57 and 59 are shown in their zero positions and in such positions a pointer 66 (FIG. 2) on the tare knob 50 points at "0" on a chart 67 marked on the front of the cabinet 41. Counterclockwise movement of the tare knob 50 from "0" to "1," from "1" to "2," etc. rotates the taps 59 counterclockwise as viewed in FIG. 3 from "0" to "1," from "1" to "2," etc. and the taps 57 counterclockwise as viewed in FIG. 3 from "0" to "1," from "1" to "2," etc. The tare knob 50 and its adjuncts are first input means for adjusting the capacity changing means when increments of voltage are to be added to offset tare and the calibrations at the tare knob 50 are indicating means operatively connected to the movable multitapped means for indicating the amount of load offset by the capacity changing means due to movement of the multitapped means from a zero setting. Each digit on the chart 67 indicates that one dial capacity of tare has been added. The dial capacity might be 1,000 pounds or 10,000 pounds, etc. In operation, the tare knob 50 is turned in the detented steps with each step equal to one full capacity of the dial. The calibrated tare equals the full dial capacity plus all extra ranges. For example, in a 20,000 pound scale having a 2,000 pound dial and the nine added range steps shown in FIG. 3 each worth, according to the example, 2,000 pounds, 20,000 pounds can be tared off. If 20,000 pounds of tare load are placed upon the scale, the amplifier 16 will continue to develop an error signal indicating that the balancing voltage is not large enough to counterbalance the output voltage of the load cell 43, causing the servo motor 17 to drive the indicator 18 off scale, until the operator who sees such off-scale indicator movement turns the tare knob 50 to the "9" on the chart 67. Turning the tare knob 50 to the "9," adds nine increments of voltage produced by the multitapped resistor 24 to the voltage produced by the adjustable potentiometer 20. With 18,000 pounds of tare load offset by the nine 2,000 pound electronic "unit weights," the scale indicator 18 swings back on scale and points at 2,000 pounds on the dial chart 47. The operator then adds the 18,000 pounds indicated on the chart 67 to the 2,000 pounds indicated on the chart 47.

The stationary detent plate 54 is attached to a second stationary detent plate 68 by means including bars 69, the second detent plate 68 being attached in turn to a frame member 169 supported through a bracket 70 from the cabinet 41. A stationary plate 71 is carried by the detent plate 68 through means including bars 72 and functions as a support for a rack back-up member 73 and as means for journaling a rotatable shaft 74. The handle 51 is attached to the shaft 74 by means of a set screw 75, the shaft 74 being coaxial with the shaft 53 and extending through holes in such shaft 53, plate 55, and wafers 58 and 60 and being journaled in the plates 68 and 71. The handle is located exteriorly of the cabinet 41 and juxtaposition with the tare knob 50. The sliders 48 and 49 (FIG. 3) are attached to the shaft 74 by means of set screws 76 and 77, respectively, to move together as one. Accordingly, rotation of the handle 51 produces rotation of the sliders 48 and 49. The handle 51 is detented for adding increments of voltage or "electronic unit weights" in steps with each step equal to one full dial capacity, such "electronic unit weights" being added to offset net or gross load. This is accomplished by a detent ball 78 which is urged out of a hole 79 in a block 80, attached to the shaft 74, by means of a spring 81 in the hole into engagement with the detent plate 68. The stationary detent plate 68 has ten spaced depressions 82, one for each of the ten taps 57 and the corresponding ten taps 59, which receive the ball 78. Hence, movement of the handle 51 from one detent position to another moves the sliders 48 and 49 into contact with their respective taps 57 and 59. Movements of the slider 49 clockwise as viewed in FIG. 3 into contact with the taps 59 adds increments of voltage to the balancing voltage to increase the capacity of the scale as described above.

The sliders 48 and 49 are shown in their zero positions and in such positions an indicia-bearing flag 83 (FIG. 1) is so positioned in front of a window 84 bearing the legend "ADD" that "0000" is seen juxtaposed to the legend "ADD." The flag 83 is carried on the end of a rod 85 pivoted at 86 in the dial housing 42 and pivoted at 87 to a rod 88 which is connected in turn through a bar 89 to a rack 90. The rack 90 meshes with a pinion 91 (FIG. 2) on the shaft 74, the rack 90 being held in engagement with the pinion by means of the back-up member 73. Clockwise movement of the handle 51 as viewed in FIG. 1 drives the rack 90 downwardly to change the indication provided by the indicia-bearing flag 83. The flag 83 is shown as a block in FIG. 3 driven by a mechanical connection indicated as a broken line connected to the sliders 48 and 49. The clockwise movement of the handle 51 rotates the sliders 48 and 49 counterclockwise as viewed in FIG. 3 from "0" to "1," from "1" to "2," etc., the indicia-bearing flag 83 keeping pace to indicate the amount of net or gross load offset by the added increments of voltage. The handle 51 and its adjuncts are second input means for adjusting the capacity changing means when increments of voltage are added to offset net or gross load and the indicia-bearing flag 83 is indicating means operatively connected to the sliders 48 and 49 for indicating the amount of load offset by the capacity changing means due to movement of the sliders from a zero setting. In operation, the handle 51 is turned in detented steps with each step equal to one full capacity of the dial. For example, in a 20,000 pound scale having a 2,000 pound dial and the nine added range steps shown in FIG. 3 each worth, according to the example, 2,000 pounds, 20,000 pounds of net or gross load is obtained by adding the indication on chart 47 to the indication provided by the flag 83. If 20,000 pounds of load are placed upon the scale, the amplifier 16 will continue to develop an error signal indicating that the balancing voltage is not large enough to counterbalance the output voltage of the load cell 43, causing the servo motor 17 to drive the indicator off scale, until the operator who sees such off-scale indicator movement turns the handle 51 to the "ADD" 18,000 indication of the flag 83. This adds nine increments of voltage produced by the multitapped resistor 24 to the voltage produced by the adjustable potentiometer 20. With 18,000 pounds of net or gross load offset by the nine 2,000 pound electronic "unit weights," the scale indicator 18 swings back on scale and points at 2,000 pounds on the dial chart 47. The operator then adds the 18,000 pounds indicated by the flag 83 to the 2,000 pounds indicated on the chart 47.

Accordingly, the taps 57 and 59 are rotated in one direction to set the tare by means of the calibrated tare knob 50 and the sliders 48 and 49 are rotated in the opposite direction to change the range for net or gross weight weighing and to drive the indicia-bearing flag 83.

Another feature resides in dividing the range change into as many steps as practicable (each resistor has a certain tolerance and the more resistors the more inaccuracy) and then providing for the double use of the range changer with a safeguard provided for preventing independent movement of the movable multitapped means and the movable slider means beyond that necessary in adding the maximum number of such steps. In the nine-range-step scale shown, if two steps are used for tare only seven unit weights can be used for net weight weighing. The capacity changing means of the invention adds a predetermined maximum number of voltage increments and stop means are provided for preventing independent movement of the movable multitapped means and the movable slider means beyond that necessary in adding said maximum number of voltage increments.

This is accomplished by placing stops 92 and 93 relative to the block 80 as shown in FIG. 2, the stops being carried by the detent plate 68, and by fixing a pin 94 in the tare knob 50 as shown in FIGS. 1 and 2. The handle 51 is rotatable between a zero position defined by the stop 92 and a nine-unit weight position defined by the stop 93, one side of the lower end of the block 80 engaging the stop 92 in the zero position as shown in FIG. 2 and the other side of such end of the block 80 engaging the stop 93 in the nine-unit-weight position. Movement of the handle 51 from its zero stop position shown in FIGS. 1 and 2 to its nine-unit-weight stop position carries the handle 51 into engagement with the pin 94 extending from the tare knob 50. In such position, it is impossible to turn the handle 51 farther because of the stop 93 and it is very difficult to turn the tare knob 50 counterclockwise as viewed in FIG. 1 because with the pin 94 and handle 51 engaged both the tare knob 50 and the handle 51 have to be turned at once and this requires that the detents for both the tare knob 50 and the handle 51 be overcome. In any event, even if both the knob 50 and the handle are turned at once, as many net weight increments of voltage are subtracted as tare increments of voltage are added so that the indications provided by the calibrated knob 50 and the flag 83 always are accurate.

Similarly, movement of the tare knob 50 from its "0" position to its "9" position carries the pin 94 into engagement with the handle 51 which is shown in its zero stop position to limit movement of the tare knob 50. It is then very difficult to turn the handle 51 clockwise because with the pin 94 and handle 51 engaged both the detented tare knob 50 and the detented handle 51 have to be turned at once. Similarly, if the handle 51 and the tare knob 50 are at intermediate positions any attempt to add more than a total of nine "unit weights" results in failure because of the necessity of moving both the handle 51 and tare knob 50 together. For example, if two range steps are used for tare only seven range steps can be used for net weight weighing. When no range steps are used for tare, the range steps can be used for net or gross weight weighing.

In operation, a container, such as a truck is moved upon the platform. If the container weighs more than one dial capacity, the indicator 18 swings off-scale and the operator turns the calibrated tare knob 50 from "zero" to one of the numbers "1–9" on the chart 67 until the indicator 18 swings back on scale. The indicator 18 reading plus the weight values represented by the calibrations at the tare knob 50 is the tare weight, provided that the indicator 18 had been set at zero by means of the tare knob 46 at the start. The tare knob 46 then is turned to set the zero of the indicator 18.

The container is filled with a commodity and, if the net weight of the commodity is more than one dial capacity, the indicator 18 swings off-scale and the operator turns the handle 51 until the indicator 18 swings back on scale. The indicator 18 reading plus the reading of the indicia-bearing flag 83 in the window 84 is the net weight of the commodity.

Having described the invention, I claim:

1. A weighing scale comprising, in combination, transducer means having an output voltage which is a function of load applied to the scale, adjustable means in circuit with the transducer means for supplying a balancing voltage in opposition to the output voltage, servo means in circuit with both said means for adjusting the adjustable means in a balancing direction in response to differences between voltages, and capacity changing means in circuit with the adjustable means for adding increments of voltage to the balancing voltage to increase the capacity of the scale, said capacity changing means including first input means for mechanically adjusting it when said increments of voltage are to be added to offset tare and second input means for mechanically adjusting it when said increments of voltage are to be added to offset net or gross load.

2. A weighing scale comprising, in combination, transducer means having an output voltage which is a function of load applied to the scale, adjustable means in circuit with the transducer means for supplying a balancing voltage in opposition to the output voltage, servo means in circuit with both said means for adjusting the adjustable means in a balancing direction in response to differences between voltages, capacity changing means in circuit with the adjustable means for adding increments of voltage to the balancing voltage to increase the capacity of the scale, said capacity changing means including two input means for mechanically adjusting it to offset tare and net or gross load, indicating means operatively connected to one of said input means for indicating the amount of tare offset by the capacity changing means, and additional indicating means operatively connected to the other input means for indicating the amount of net or gross load offset by the capacity changing means.

3. A weighing scale comprising, in combination, transducer means having an output voltage which is a function of load applied to the scale, adjustable means in circuit with the transducer means for supplying a balancing voltage in opposition to the output voltage, servo means in circuit with both said means for adjusting the adjustable means in a balancing direction in response to differences between voltages, and capacity changing means in circuit with the adjustable means for adding increments of voltage to the balancing voltage to increase the capacity of the scale, said capacity changing means including movable multitapped means and movable slider means engaging the multitapped means.

4. A weighing scale according to claim 3 wherein indicating means are operatively connected to the movable multitapped means for indicating the amount of load offset by the capacity changing means due to movement of the multitapped means from a zero setting in a first direction and additional indicating means are operatively connected to the movable slider means for indicating the amount of load offset by the capacity changing means due to movement of the slider means from a zero setting in a direction opposite to said first direction.

5. A weighing scale according to claim 4 wherein the capacity changing means adds a predetermined maximum number of voltage increments and stop means are provided for preventing independent movement of the movable multitapped means and the movable slider means beyond that necessary in adding said maximum number of voltage increments.

References Cited
UNITED STATES PATENTS

| | | | |
|---|---|---|---|
| 2,798,955 | 7/1957 | Balash | 200—6 |
| 3,221,829 | 12/1965 | Kohler | 177—211 |

RICHARD B. WILKINSON, *Primary Examiner.*

LAWRENCE H. HAMBLEN, *Assistant Examiner.*

U.S. Cl. X.R.

177—167